United States Patent
Shimizu et al.

[11] Patent Number: 6,070,684
[45] Date of Patent: Jun. 6, 2000

[54] AUTOMATIC STEERING SYSTEM FOR VEHICLE

[75] Inventors: Yasuo Shimizu; Katsuhiro Sakai, both of Wako, Japan

[73] Assignee: Honda Giken Kogyo Kabushiki Kaisha, Tokyo, Japan

[21] Appl. No.: 09/111,766

[22] Filed: Jul. 8, 1998

[30] Foreign Application Priority Data

Jul. 16, 1997 [JP] Japan .................................. 9-190921

[51] Int. Cl.⁷ .................................................. B62D 1/00
[52] U.S. Cl. ........................... 180/204; 180/446; 701/41
[58] Field of Search ................................. 180/204, 446, 180/167–169; 701/23, 25, 41

[56] References Cited

U.S. PATENT DOCUMENTS

| | | | |
|---|---|---|---|
| 4,735,274 | 4/1988 | Good et al. .............................. | 180/204 |
| 4,931,930 | 6/1990 | Shyu et al. ................................ | 701/36 |
| 4,953,650 | 9/1990 | Ohmura .................................... | 180/412 |
| 5,742,141 | 4/1998 | Czekaj ..................................... | 318/587 |
| 5,931,252 | 8/1999 | Shimizu et al. ........................ | 180/204 |
| 5,931,253 | 8/1999 | Shimizu et al. ........................ | 180/204 |
| 5,957,232 | 9/1999 | Shimizu et al. ........................ | 180/204 |

FOREIGN PATENT DOCUMENTS

3-74256  3/1991  Japan .
4-55168  2/1992  Japan .

*Primary Examiner*—Brian L. Johnson
*Assistant Examiner*—Dianna Draper
*Attorney, Agent, or Firm*—Arent Fox Kintner Plotkin & Kahn, PLLC

[57] ABSTRACT

A vehicle is prevented from being moved in an unanticipated direction at a target position or a moving direction reversing position on a locus of movement based on an automatic steering operation. When a vehicle has been moved from a start position through a moving-direction reversing position to reach a target position by automatic steering control for moving the vehicle along a previously stored locus of movement, thereby finishing the automatic steering control, a driver further moves the vehicle backwards from the target position to a parking position. At this time, if the driver has his or her hands released from a steering wheel, and the course of movement of the vehicle is disturbed due to an external disturbance such as an undulation in the road surface, the steering angle of a wheel is maintained so that it is not varied from a steering angle at the target position. Further, even when the vehicle has been moved to a position past the moving direction reversing position, the steering angle of the wheel is maintained at the steering angle at the moving direction reversing position.

12 Claims, 5 Drawing Sheets

AUTOMATIC STEERING SYSTEM FOR VEHICLE

BACKGROUND OF THE INVENTION

1. Field of the Invention

The present invention relates to an automatic steering system for a vehicle, for automatically parking the vehicle without recourse to steering by a driver.

2. Description of the Prior Art

Automatic steering systems for vehicles are already known from Japanese Patent Application Laid-Open Nos. 3-74256 and 4-55168. The automatic steering systems for vehicles utilize an actuator of a conventionally well-known electric power steering device, and are designed so that reverse parking and linear parking are automatically controlled by controlling the actuator based on the relationship between a traveling distance of the vehicle and a steering angle that are previously stored.

The automatic steering is carried out with driver's hands released from a steering wheel. For this reason, when the driver further moves the vehicle backwards after the vehicle has reached a target position to finish the automatic steering control, the vehicle is brought into a "no hands" driven state. At this time, if there is an undulation in the road surface, if the friction coefficient of a road surface contacted by left and right wheels is not uniform, or if a torsional deformation remains in a tire after the steering, there is a possibility that the steering wheel is turned, so that the vehicle is moved in an unintended direction.

SUMMARY OF THE INVENTION

The present invention has been accomplished with the above circumstance in view, and it is an object of the present invention to prevent the vehicle from being moved in an unintended direction at a target position or a moving direction reversing position, on the locus of movement based on the automatic steering.

To achieve the above object, there is provided an automatic steering system for a vehicle, comprising a movement locus setting means for storing or calculating a locus of movement of the vehicle to a target position, and an actuator adapted to steer a wheel in accordance with the locus of movement set by the movement locus setting means, in place of a driver's steering operation. The automatic steering system further includes a steering angle maintaining means for controlling the actuator, so that the steering angle of the wheel is maintained constant, after the vehicle has been moved to the target position.

With the above arrangement, even if the movement of the vehicle is further continued after the vehicle has reached the target position on the locus of movement, the steering angle of the wheel is maintained constant by the steering angle maintaining means. Therefore, it is possible to prevent the vehicle from being moved in an unanticipated direction due to an external disturbance such as an undulation in a road surface or the like.

According to another aspect of the present invention, there is provided an automatic steering system for a vehicle, comprising a movement locus setting means for storing or calculating a locus of movement of the vehicle to a target position, and an actuator adapted to steer the vehicle wheels in accordance with the locus of movement set by the movement locus setting means, in place of a driver's steering operation. The automatic steering system further includes a steering angle maintaining means for controlling the actuator, so that the steering angle of the wheel is maintained constant, after the vehicle has been moved to a moving-direction reversing position on the locus of movement. Thus even if the movement of the vehicle is further continued after the vehicle has reached the moving-direction reversing position on the locus of movement, the steering angle of the wheel is maintained constant by the steering angle maintaining means. Therefore, it is possible to prevent the vehicle from being moved in an unanticipated direction due to an external disturbance such as an undulation in a road surface or the like.

The locus of movement of the vehicle is set as a steering angle of the wheel with respect to a traveling distance of the vehicle. Thus even if the travel speed of the vehicle is varied, a constant locus of movement can be ensured.

In addition, the automatic steering system further includes a brake input means operated by the driver, and the control of the actuator based on the locus of movement, is permitted when the brake input means is being operated. Thus, when the vehicle is moved close to an obstacle, the brake input means can be immediately operated to stop the vehicle.

Further, the steering angle which is maintained constant, is a steering angle set in correspondence to the target position on the locus of movement. Thus the steering angle when the vehicle has reached the target position on the locus of movement, may be maintained and hence, control is easy.

In addition, the steering angle maintained constant is a steering angle set in correspondence to the moving-direction reversing position on the locus of movement. Thus, the steering angle at the time when the vehicle has reached the moving-direction reversing position on the locus of movement may be maintained and hence, control is easy.

Further, the steering angle is maintained constant at zero. Thus, the vehicle is maintained in a straight travel state after passing the target position or the moving-direction reversing position on the locus of movement. Therefore, misalignment can be maintained at a minimum.

The automatic steering system further includes a display means for indicating to the driver that the actuator is maintaining the steering angle constant. The driver can thus reliably perceive that the steering angle is maintained constant.

When the range of an automatic transmission is switched over to a neutral range or a parking range, the maintaining of the steering angle is discontinued. Thus when the vehicle is stopped, the maintaining of the steering angle is automatically discontinued and hence, it is unnecessary to carry out a special discontinuing operation.

DETAILED DESCRIPTION OF THE PREFERRED EMBODIMENTS

Figure 1:
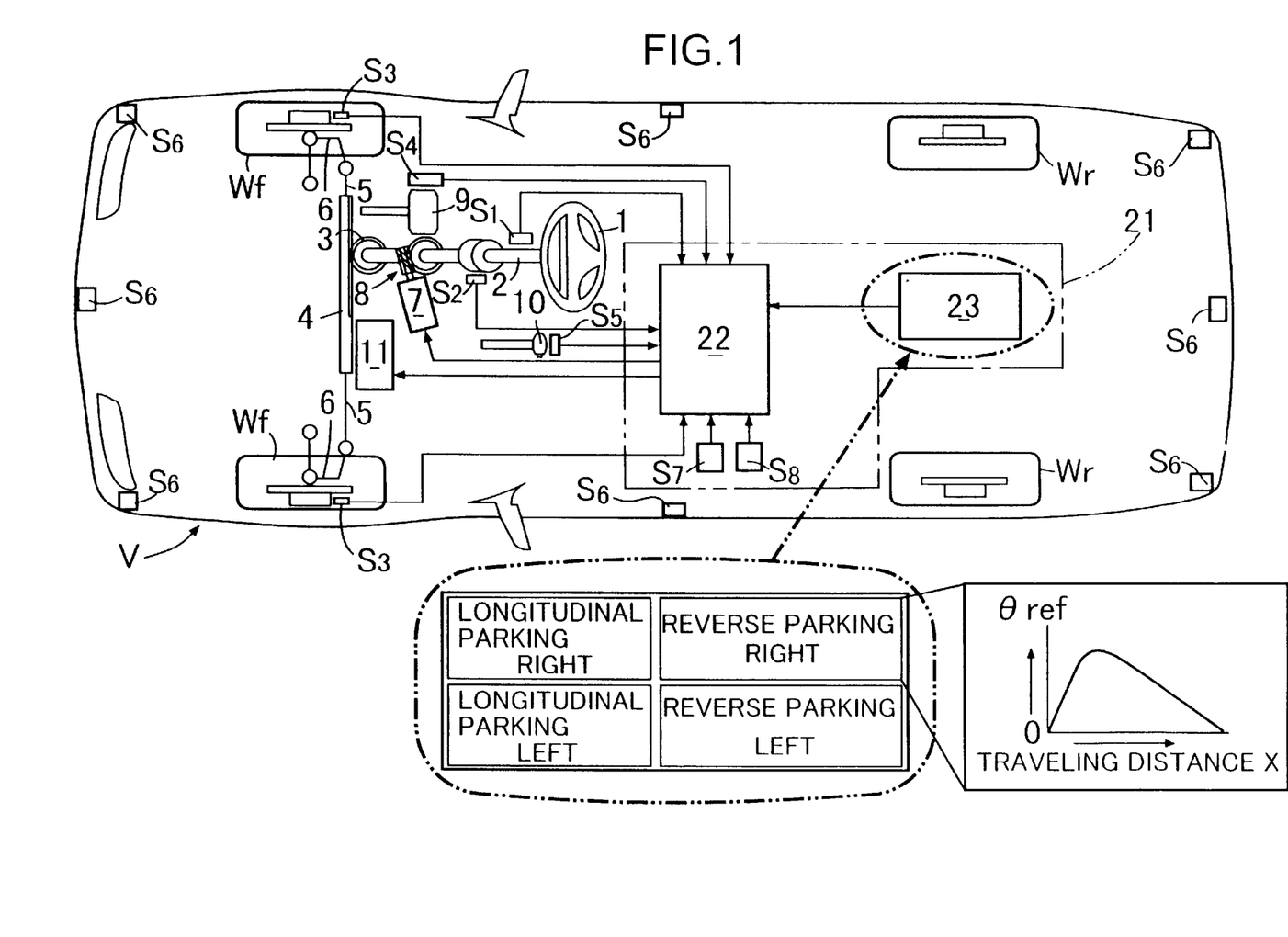
FIG. 1 is a diagram of a vehicle including a steering control system of the present invention.

As shown in FIG. 1, a vehicle V includes a pair of front wheel Wf, Wf and a pair of rear wheels Wr, Wr. A steering wheel 1 and the front wheels Wf, Wf which are steering wheels, are connected to each other by a steering shaft 2 rotated in unison with the steering wheel 1. A pinion 3 is provided at a lower end of the steering shaft 2, a rack 4 is meshed with the pinion 3, left and right tie rods 5 are provided at opposite ends of the rack 4, and left and right knuckles 6 are connected to the tie rods 5. A steering actuator 7 comprising an electric motor is connected to the steering shaft 2 through a worm gear mechanism 8, in order to assist the driver in the operation of the steering wheel 1, or to carry out automatic steering for garaging of the vehicle, which will be described hereinafter.

A steering control system 21 comprises a control section 22 and a storage section 23. Inputted to the control section 22 are signals from a steering angle detecting means $S_1$ for detecting the steering angle $\theta$ of the front wheels Wf, Wf on the basis of a rotational angle of the steering wheel 1, a steering torque detecting means $S_2$ for detecting the steering torque of the steering wheel, front wheel rotational angle detecting means $S_3$, $S_3$ for detecting the rotational angles of the left and right front wheels Wf, Wf, a brake-operation amount detecting means $S_4$ for detecting the amount of operation of brake pedal 9 as a brake input means, a shift range detecting means $S_5$ for detecting the shift range (a "D" range, an "R" range, an "N" range, a "P" range and the like) selected by a select lever 10, and eight object detecting means $S_6$ provided at a front portion, a central portion and a rear portion of the vehicle V. The object detecting means $S_6$ may be of any known type, such as sonar, radar, a television camera or the like. Lines connecting the eight object detecting means $S_6$ and the control section 22 are omitted from the drawings for the purpose of preventing the complication of the drawings. The control section 22 comprises a steering angle maintaining means of the present invention, and the storage section 23 comprises a movement locus setting means of the present invention.

Figure 3:
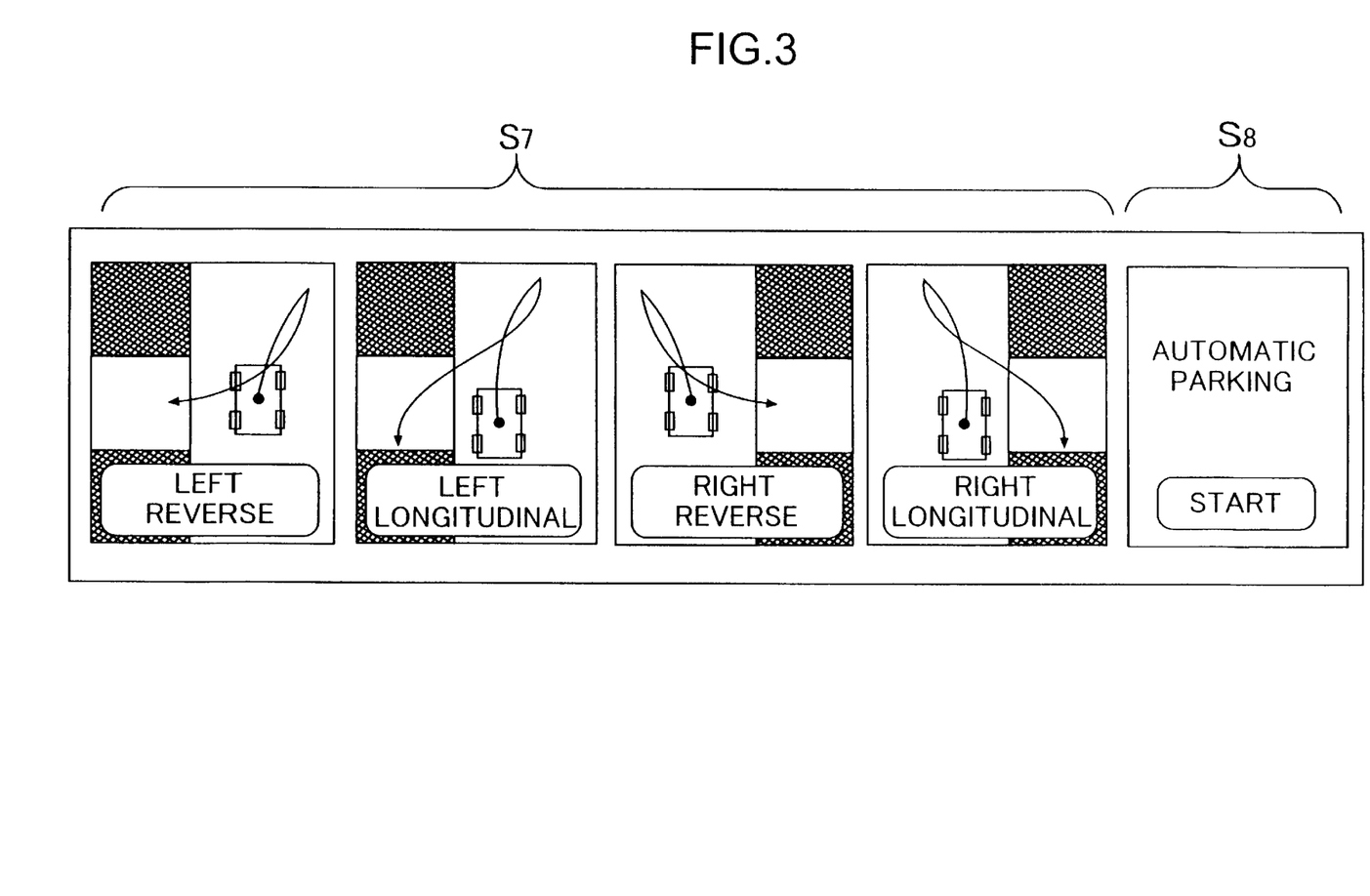
FIG. 3 is a diagram showing a mode selecting switch and an automatic parking start switch.

As seen from FIGS. 1 and 3, a mode selecting switch $S_7$ and an automatic parking start switch $S_8$ operated by the driver, are connected to the control section 22. The mode selecting switch $S_7$ includes four buttons which are operated to select any of four parking modes: a reverse parking/right mode, a reverse parking/left mode, a longitudinal parking/right mode, and a longitudinal parking/left mode. The automatic parking start switch $S_8$ is operated to start automatic parking in any mode selected by the mode selecting switch $S_7$. The mode selecting switch $S_7$ and the automatic parking start switch $S_8$ are mounted at locations where any occupant other than the driver cannot operate these switches $S_7$ and $S_8$, e.g., at a right side of the instrument panel, or on the right door of the driver in a right-hand drive vehicle.

Data for the four parking modes, i.e., relationships of reference steering angles $\theta$ref to traveling distances X of the vehicle V are previously stored as a table in the storage section 23. The traveling distance X of the vehicle V is calculated by multiplying the known peripheral length of the front wheel Wf by the rotational angle of the front wheel Wf, detected by the front wheel rotational-angle detecting means $S_3$. Either one of a high-select value and a low-select value outputted from the pair of left and right front wheel rotational-angle detecting means $S_3$ and an average value of the high-select value and the low-select value is used for the calculation of the traveling distance X.

The control section 22 controls the operation of the steering actuator 7 and the operation of an operational stage display device 11 including a liquid crystal monitor, a speaker, a lamp, a chime, a buzzer or the like, based on the signals from the detecting means $S_1$ to $S_6$ and the switches $S_7$ and $S_8$, and the data for the parking modes stored in the storage section 23.

The operation of the embodiment of the present invention having the above-described arrangement will be described below.

When the vehicle is in a usual state in which automatic parking is not carried out (when the mode selecting switch $S_7$ is not in an ON state), the steering control system 21 functions as a regular power-steering control unit. More specifically, when the steering wheel 1 is operated by the driver to turn the vehicle V, the steering torque detecting means $S_2$ detects a steering torque inputted to the steering wheel 1, and an actuator driving control means 22$b$ controls the driving of the steering actuator 7, based on the steering torque. As a result, the left and right front wheels Wf, Wf are steered by the driving force from the steering actuator 7, whereby the steering operation provided by the driver is assisted.

The contents of an automatic parking control will be described with the reverse parking/left mode (the mode in which the parking is conducted while the vehicle is being moved backwards to a parking position lying on the left side of the vehicle V) taken as an example.

Figure 2A:
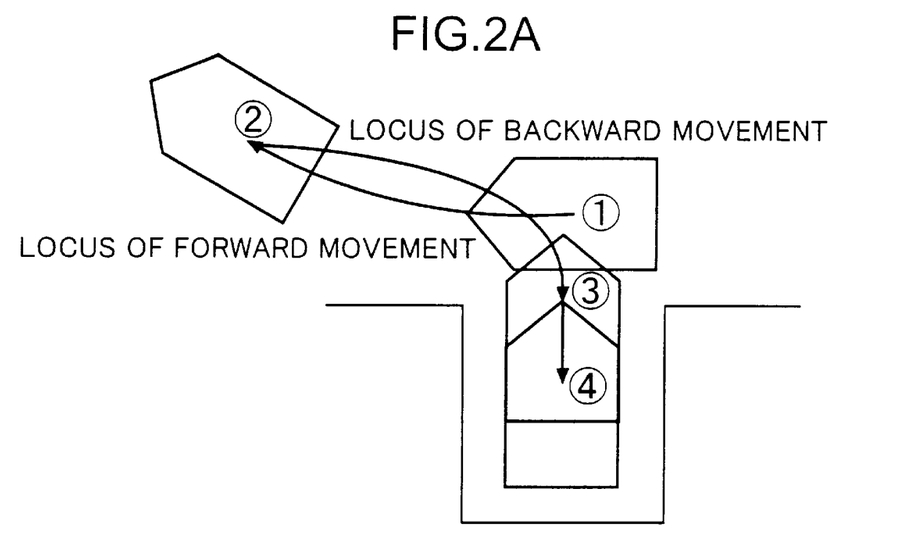
FIGS. 2A and 2B are illustrations for explaining a reverse parking/left mode.

First, as shown in FIG. 2A, the vehicle V is moved near to a garage where the vehicle V is to be parked, by the steering operation provided by the driver himself. In a state in which the left side of the vehicle body has been located as close as possible to an inlet line of the garage, the vehicle V is stopped at a position (a start position (1)) at which a predetermined reference point (e.g., a left sideview mirror) is matched with a center line of the garage, and the direction of the vehicle V is perpendicular to the center line of the garage. When the button (see FIG. 3) of the mode selecting switch $S_7$ corresponding to the reverse parking/left mode, is pushed to conduct automatic parking in the reverse parking/left mode, such button is lighted, and the speaker of the operational stage display device 11 speaks "left reverse parking". At this time, if the driver perceives that he pushed the button for the wrong mode, such button operation can be cancelled by pushing it again.

When the automatic parking start switch $S_8$ is not operated for predetermined time (e.g., 5 seconds) after the pushing of the button of the mode selecting switch $S_7$ corresponding to the reverse parking/left mode, or when the vehicle V has been moved through a predetermined distance (e.g., 50 cm) before the operation of the automatic parking start switch $S_8$, the speaker of the operational stage display device 11 speaks "the automatic parking is canceled", and then, the lighted button corresponding to the parking/left mode is turned off. Therefore, when the driver decides to discontinue the automatic parking due to the change of his mind after the driver has pushed a certain button of the mode selecting switch $S_7$, the automatic parking can be canceled only by waiting for the above-described predetermined time to elapse, without carrying out a special canceling operation, or only by moving the vehicle to start the spontaneous parking, leading to an enhanced convenience. When the distance of traveling of the vehicle is shorter than a predetermined distance, the automatic parking is not canceled. Therefore, when the driver has loosened the brake pedal 9 unconsciously to cause the vehicle V to move slightly, the automatic parking cannot be canceled.

When the automatic parking start switch $S_8$ is pushed with any button of the mode selecting switch $S_7$ being in a lighted state, the automatic parking start switch $S_8$ is lighted to start the automatic parking control, and the speaker of the operational stage display device 11 speaks "slowly move the vehicle forwards". In a state in which the automatic parking control is being carried out, the current position of the vehicle, surrounding obstacles, a parking position, a presumed locus of movement of the vehicle from the start position to the parking position, the moving-direction reversing position for switch-over of the forward movement to the backward movement and the like, are indicated on the operational stage display device 11. In addition, various instructions and warnings are emitted by voice from the speaker to the driver. During automatic parking control, the front wheels Wf, Wf are automatically steered based on the data for the reverse parking/left mode selected by the mode selecting switch $S_7$ only by the driver loosening the brake pedal 9 to perform creeping of the vehicle V, even if the steering wheel 1 is not operated. The carrying-out of the automatic parking control is permitted when the creeping of the vehicle V is being performed by operating the brake pedal 9 by the driver in the above manner. Therefore, when the drive has found an obstacle, the vehicle V can be stopped by immediately depressing the brake pedal 9 by the driver.

Thus, when any button of the mode selecting switch $S_7$ is pushed to select a desired mode, and it is confirmed that such mode is not wrong, the automatic parking start switch $S_8$ is pushed and the automatic parking control is started. Therefore, even if the driver pushes the button for the wrong mode, there is a time enough to correct the wrong mode, and moreover, it is possible to reliably prevent the occurrence of the misoperation.

While the vehicle V has been moved forwards from the start position (1) to the reversing position (2), the front wheels Wf, Wf are automatically steered rightwards by the automatic parking control. When the vehicle V has reached the reversing position (2), the speaker announces "stop the vehicle and carry out the shift change". When the driver has stopped the vehicle and carries out the shift change, the speaker announces "slowly move the vehicle backwards". While the vehicle V is moved backwards from the reversing position (2) to a target position, the front wheels Wf, Wf are automatically steered leftwards. When the vehicle V has reached the target position (3), the direction of the vehicle is parallel to the center line of the garage, and the steering angle of the front wheels Wf, Wf is zero.

Figure 4:
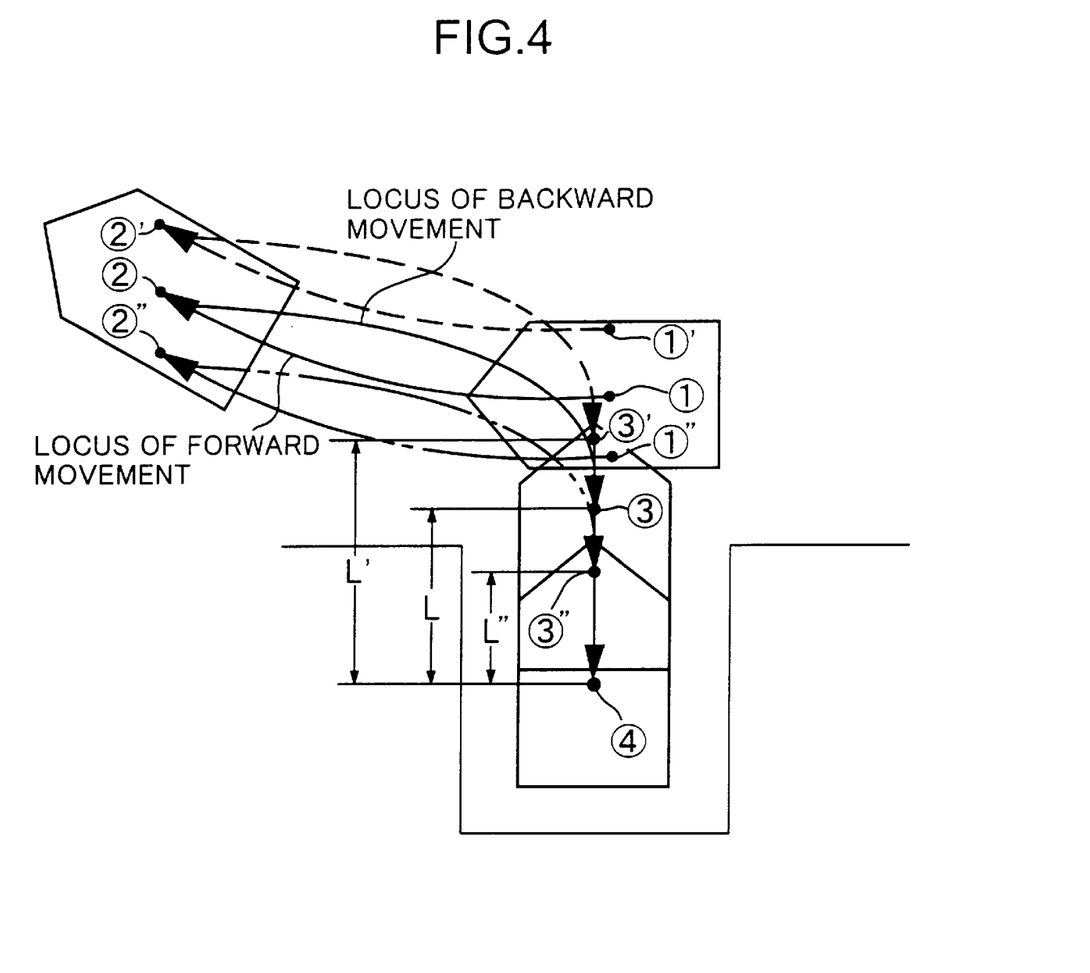
FIG. 4 is an illustration for explaining a steering angle maintaining operation.

A final parking position (4) for the vehicle V lies perpendicularly in rear of the target position (3), but the distance from the target position (3) to the parking position (4) is varied every time the automatic parking is carried out. This is because when the automatic parking is started with the optimal start position (1), the target position and the parking position are at points indicated by (3) and (4), and the distance from the target position (3) to the parking position (4) is L, as shown in FIG. 4. When the start position (1) is deviated to a point (1)' in a direction away from the garage, the target position is also deviated from (3) to (3)', and hence, the distance L' from the target position (3)' to the parking position (4) is larger than the distance L. Conversely, when the start position (1) is deviated to a point (1)'' in a direction toward the garage, the target position is also deviated from (3) to (3)'' and hence, the distance L'' from the target position (3)'' to the parking position (4) is smaller than the distance L.

Therefore, when the vehicle V has reached any of the target positions (3), (3)' and (3)'' by the automatic steering control, the speaker of the operational display device 11 announces "carefully stop the vehicle backwards", and according to such instruction, the driver moves the vehicle V backwards to the parking position (4) and stops the vehicle V at the parking position (4). When the vehicle V has been stopped and the driver has operated the shift lever to the non-travel range (i.e., the "N" range or the "P" range), the speaker of the operational stage display device 11 announces "the leftward reverse parking is finished", thereby finishing the automatic parking control. By the fact that the driver spontaneously sets the distance of backward movement from the target position (3), (3)' or (3)'' to the parking position (4) in the above manner, the vehicle V can be guided to the parking position (4) which is always constant, even if there is a deviation in the start positions (1), (1)' and (1)''.

Figure 2B:
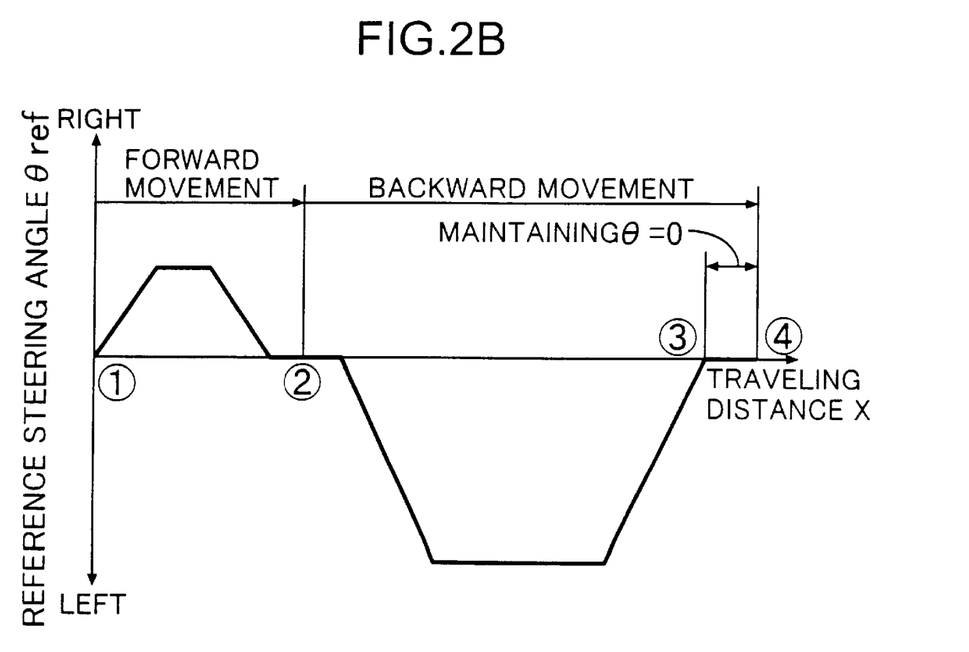

As can be seen from FIG. 2B, while the automatic steering is being carried out, the control section 22 calculates a deviation $E=(\theta ref-\theta)$, based on the reference steering angle $\theta ref$ in the reverse parking/left mode read from the storage section 23 and the steering angle $\theta$ inputted from the steering angle detecting means $S_1$, and controls the operation of the steering actuator 7, so that the deviation E becomes zero. At this time, the data of the reference steering angle $\theta ref$ is established in correspondence to the traveling distances of the vehicle V. Therefore, even if there is a variation in creeping vehicle speed, the vehicle V is always moved on the above-described locus of movement.

While the vehicle V is moved from the start position (1), (1)' or (1)Δto the parking position (4), the driver has his hands released from the steering wheel 1. However, while the vehicle is being moved from the start position (1), (1)' or (1)'' to the target position (3), (3)' or (3)'', the actuator 7 is controlled on the basis of the stored locus of movement and hence, the steering angle $\theta$ of the front wheels Wf, Wf cannot be unexpectedly changed, even if an external disturbance such as an unevenness of a road surface is applied. On the other hand, if the control of the actuator 7 is stopped when the vehicle has reached the target position (3), (3)' or (3)'', it is impossible to maintain the steering angle $\theta$ by the actuator 7 and hence, the steering angle $\theta$ of the front wheels Wf, Wf is easily varied due to the external disturbance. As a result, while the vehicle is moved from the target position (3), (3)' or (3)''to the parking position (4), for example, if there is an undulation in the road surface, if the friction coefficient of the road surface contacted by the left and right wheels is not uniform, or if a torsional deformation remains in a tire after the steering, there is a possibility that the steering wheel is turned, so that the vehicle is moved in an unanticipated direction.

Therefore, in this embodiment, when the vehicle V has reached the target position (3), (3)' or (3)'' to finish the control of the actuator 7 based on the stored locus of movement, the control section 22 maintains the steering angle $\theta$ of the front wheels Wf, Wf at zero (i.e., the steering angle at the target position (3) in the stored locus of movement) through the actuator 7. Thus, while the vehicle V is being moved toward the parking position (4), it is possible to prevent the steering angle $\theta$ of the front wheels Wf, Wf from being varied due to an external disturbance such as an undulation in the road surface, thereby accurately guiding the vehicle V to the parking position (4). The maintaining of the steering angle $\theta$ through the actuator 7, is automatically finished, when the vehicle V has reached the parking position (4) and the driver has operated the shift lever to the non-travel range. Therefore, the automatic parking control can be finished without carrying out a special finishing operation. When the maintaining of the steering angle $\theta$ through the actuator 7 is being carried out, the driver is notified by the lamp of the operational stage display device 11, by voice or the like.

Even if the automatic parking start switch $S_8$ is pushed again by mistake during execution of the automatic parking control, such operation is ignored, if the vehicle V is not in its stopped state at that time. Therefore, it is not a possibility that the automatic parking control is finished against the driver's will, thereby causing the vehicle V to be brought into a "no-hands" driven state. In addition, even if the mode selecting switch $S_7$ is operated by mistake during execution of the automatic parking control, such operation is ignored and hence, there is no possibility that the mode of the automatic parking control is switched against the driver's will, thereby causing the vehicle V to be moved in an unintended direction.

The automatic parking control is canceled when the automatic parking start switch $S_8$ is pushed again in a state in which the driver has stopped the vehicle. Further, in the following cases (1) to (3) in addition to the above case, the automatic parking control is canceled and restored to the usual power-steering control: (1) when the driver has excessively loosened the brake pedal, causing the vehicle speed to exceed a maximum speed suitable for the automatic parking control (e.g., 5 km/hr); (2) when the driver has operated the steering wheel 1; and (3) when any of the obstacle detecting means $S_6$ has detected an obstacle.

Figure 5A:
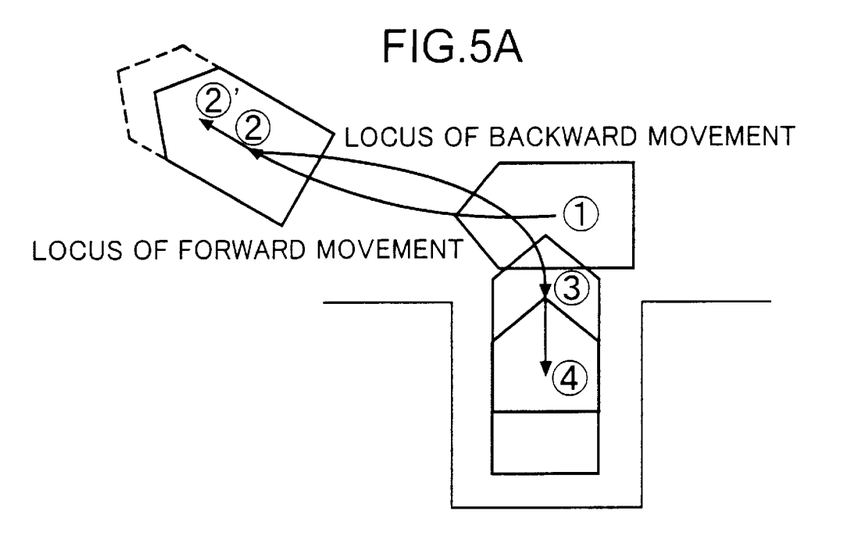
FIGS. 5A and 5B are illustrations similar to FIGS. 2A and 2B, according to a second embodiment of the present invention.
Figure 5B:
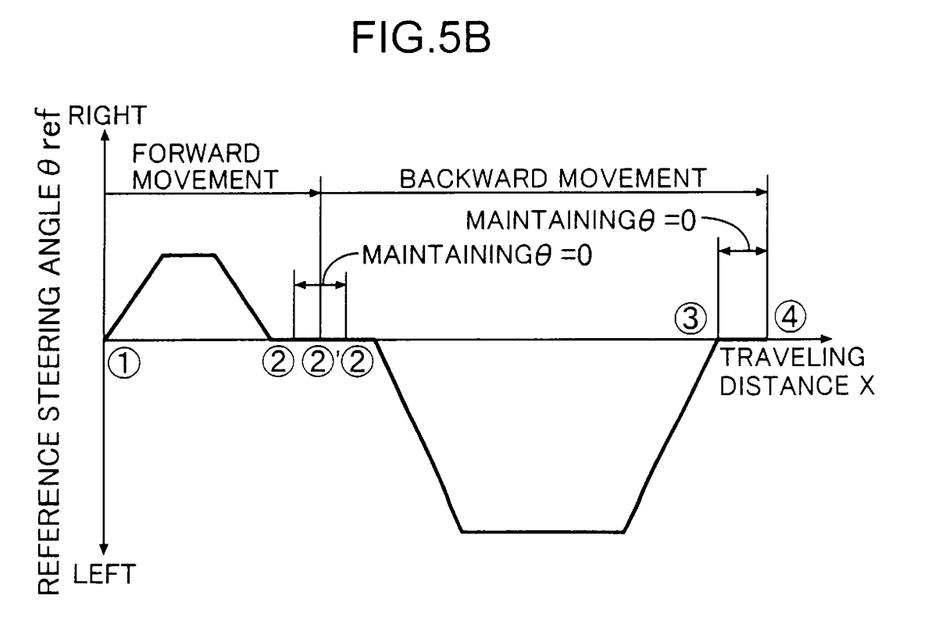

A second embodiment of the present invention will now be described with reference to FIGS. 5A and 5B.

In the first embodiment, the maintaining of the steering angle θ through the actuator 7 is carried out after the vehicle V has reached the target position (3), (3)' or (3)", but in the second embodiment, the maintaining of the steering angle θ is carried out after the vehicle V has reached the reversing position (2).

This will be further described below. When the vehicle has reached the reversing position (2), the steering angle θ of the front wheels Wf, Wf based on the stored locus of movement, is zero. At this time, when the vehicle V has been moved forward past the reversing position (2), due to the retardation of the driver's braking operation or the like, the steering of the front wheels Wf, Wf based on the locus of movement is discontinued. However, while the vehicle V is stopped at the position (2)' after passing through the reversing position (2) and is returned to the reversing position (2) by switching the forward movement to the backward movement, the steering angle θ of the front wheels Wf, Wf is maintained at zero through the actuator 7. This makes it possible to prevent the changing of the direction of movement of the vehicle V due to an external disturbance.

The confirmation of the fact that the vehicle V has been returned to the reversing position (2) is feasible by the storage of the distance through which the vehicle has been moved from the reversing position to the position (2)'. Thus, by starting the steering of the front wheels Wf, Wf again, based on the stored locus of movement after returning of the vehicle V to the reversing position (2), the vehicle V can be accurately guided to the target position.

The locus of movement of the vehicle V to the target position has been previously stored in the storage section 23 in the above embodiment, but the locus of movement can be calculated from the current position of the vehicle V and the target position. In addition, the steering angle θ is maintained constant at zero in the embodiment, but may be any steering angle θ other than zero.

As discussed above, even if the movement of the vehicle is continued after the vehicle has reached the target position on the locus of movement, the steering angle of the wheels is maintained by the steering angle maintaining means. Therefore, it is possible to prevent the vehicle from being moved in an unanticipated direction due to an external disturbance such as an undulation in the road surface and the like.

Further, even if the movement of the vehicle is continued after the vehicle has reached the moving-direction reversing position on the locus of movement, the steering angle of the wheels is maintained by the steering angle maintaining means. Therefore, it is possible to prevent the vehicle from being moved in an unanticipated direction due to an external disturbance such as an undulation in the road surface and the like.

Even if the travel speed of the vehicle is varied, a constant locus of movement can be ensured.

When the vehicle has been moved close to an obstacle, the brake input means can be immediately operated to stop the vehicle.

The steering angle when the vehicle has reached the target position on the locus of movement may be maintained and hence, the control is easy. Also, the steering angle at the time when the vehicle has reached the reversing position on the locus of movement may be maintained and hence, the control is easy.

The vehicle is maintained in a straight travel state after it has been moved past the target position or the reversing position on the locus of movement. Therefore, misalignment can be suppressed to minimize misalignment.

When the vehicle has been stopped, the maintaining of the steering angle is automatically discontinued and therefore, it is unnecessary to carry out a special discontinuing operation.

Although the embodiments of the present invention have been described in detail, it will be understood that the present invention is not limited to the above-described embodiments, and various modifications in design may be made without departing from the subject matter of the present invention.

We claim:

1. An automatic steering system for a vehicle, comprising:
   a movement locus setting means for storing a locus of movement of the vehicle to a target position,
   an actuator for steering a wheel of the vehicle in accordance with the locus of movement set by said movement locus setting means, without a driver's steering operation, and
   a steering angle maintaining means coupled to said actuator for controlling said actuator, such that a steering angle of said wheel is maintained constant, after the vehicle has been moved to said target position.

2. An automatic steering system for a vehicle, comprising:
   a movement locus setting means for storing a locus of movement of the vehicle to a target position,
   an actuator for steering a wheel of the vehicle in accordance with the locus of movement set by said movement locus setting means, without a driver's steering operation, and
   a steering angle maintaining means coupled to said actuator for controlling said actuator, such that a steering angle of said wheel is maintained constant, after the vehicle has been moved to a moving-direction reversing position on said locus of movement.

3. An automatic steering system for a vehicle, comprising:
   a movement locus setting means for calculating a locus of movement of the vehicle to a target position,
   an actuator for steering a wheel of the vehicle in accordance with the locus of movement set by said movement locus setting means, without a driver's steering operation, and a steering angle maintaining means coupled to said actuator for controlling said actuator, such that a steering angle of said wheel is maintained constant, after the vehicle has been moved to said target position.

4. An automatic steering system for a vehicle, comprising:

a movement locus setting means for calculating a locus of movement of the vehicle to a target position, an actuator for steering a wheel of the vehicle in accordance with the locus of movement set by said movement locus setting means, without a driver's steering operation, and a steering angle maintaining means coupled to said actuator for controlling said actuator such that a steering angle of said wheel is maintained constant, after the vehicle has been moved to a moving-direction reversing position on said locus of movement.

5. An automatic steering system for a vehicle according to any one of claims 1 to 4, wherein the locus of movement of the vehicle is set as said steering angle of the wheel with respect to a traveling distance of the vehicle.

6. An automatic steering system for a vehicle according to any one of claims 1 to 4, further including a brake input means operated by the driver, and wherein the control of said actuator based on said locus of movement, is permitted when the brake input means is being operated.

7. An automatic steering system for a vehicle according to any one of claims 1 to 4, wherein the steering angle which is maintained constant is a steering angle set in correspondence to the target position on said locus of movement.

8. An automatic steering system for a vehicle according to claim 7, wherein the steering angle which is maintained constant is zero.

9. An automatic steering system for a vehicle according to any one of claims 1 to 4, wherein the steering angle which is maintained constant, is a steering angle set in correspondence to the moving-direction reversing position on said locus of movement.

10. An automatic steering system for a vehicle according to claim 8, wherein the steering angle which is maintained constant is zero.

11. An automatic steering system for a vehicle according to any one of claims 1 to 4, further including a display means for indicating to the driver that said actuator maintains the steering angle constant.

12. An automatic steering system for a vehicle according to any one of claims 1 to 4, wherein when the range of an automatic transmission of the vehicle is switched to a neutral range or a parking range, the maintaining of the steering angle is discontinued.

* * * * *